April 28, 1970  C. R. WARD  3,508,899
EDGE HEATING IN ANNEALING PROCESS
Original Filed Jan. 28, 1966  3 Sheets-Sheet 3

INVENTOR
CECIL R. WARD

ATTORNEYS 3,508,899
EDGE HEATING IN ANNEALING PROCESS
Cecil R. Ward, Gibsonia, Pa., assignor to PPG Industries,
Inc., Pittsburgh, Pa., a corporation of Pennsylvania
Continuation of application Ser. No. 534,938, Jan. 28,
1966, which is a continuation-in-part of application
Ser. No. 464,507, June 16, 1965. This application
Mar. 21, 1969, Ser. No. 809,331
Int. Cl. C03b 25/00
U.S. Cl. 65—119                                        5 Claims

ABSTRACT OF THE DISCLOSURE

This invention relates to a method and apparatus for annealing a ribbon of glass by controlling the temperature between the center of the glass ribbon and the temperature of points near the edges of said ribbon in relation to the temperature of other sections of the moving ribbon to improve the uniformity of the annealing of said glass ribbon.

The apparatus provides means for adding heat or otherwise controlling the temperature of the said points of the ribbon in a glass drawing machine.

---

This application is a continuation of application Ser. No. 534,938, filed Jan. 28, 1966 now abandoned, which in turn is a continuation-in-part of Ser. No. 464,507, filed June 16, 1965, now abandoned.

This invention relates to a method of annealing glass and is particularly concerned with an improved method of cooling and annealing a continuous ribbon of glass to provide greater efficiency in the manufacturing process while retaining an optimum level of residual stress in the resulting produce.

Glass has three dimensions: (1) the component extending through the thickness of the glass, (2) the component extending longitudinally along the glass, and (3) the component extending transversely across the surface of the glass.

The present invention is concerned with temperature profiles across the major surfaces of the glass sheet as the glass passes through the annealing range and as it is cooled to equilibrium at a room temperature.

An imaginary line drawn across the major surfaces of the glass establishes a base line for temperature measurements. Temperature readings taken at points along this line establish the temperature profile of the sheet across that line and can be plotted on a graft to show the temperature profile. If a series of lines are drawn across the ribbon of glass, a series of temperature profiles will result and each profile can be plotted to establish the temperature profile of the glass at that line.

If one envisions a process wherein a continuous ribbon of glass is conveyed through an annealing lehr or where separate plates of glass are conveyed through a lehr, temperature profiles can be established for different points in time, i.e., at different positions in the lehr.

Considerable temperature differences have been observed to exist across the major surfaces of a glass plate or continuous ribbon of glass being annealed in accordance with previously known techniques and facilities, i.e., the surface temperature at the edge of a continuous ribbon of glass being annealed in a vertical annealing lehr has been observed to be more than 100° F. cooler than the surface temperature at the center of the ribbon as the temperature of the ribbon approaches the lower limit of the annealing range at the upper end of the lehr.

In a vertical annealing lehr, these differences in temperature across the major surfaces of the ribbon are attributed to stack effect and, in general, lack of adequate temperature control. However, even where adequate control of the temperature across the major surfaces of the ribbon is maintained, it has been discovered that special consideration must be given to the temperature of the edge portions of the ribbon.

The edge of a plate or continuous ribbon of glass cools more rapidly than the central portions thereof. The rate of heat transfer is the same at the edge of the plate or ribbon as it is across the major surfaces but the edge is exposed to more ambient atmosphere per unit mass of glass than the central portions and therefore releases thermal energy more quickly than portions of the glass inward from the edge. Therefore, edge cooling will cause the edge portions of the plate or ribbon to be at a much lower temperature than the central portions.

This edge cooling effect produces similar difficulties in annealing operations when the glass is annealed in a horizontal lehr or in a vertical lehr.

"Stack effect" is the term employed to describe the tendency of hot gases from the lower portion of an enclosed vertical annealing lehr and drawing chamber to rise in the enclosed annealing lehr in the same manner that hot gases rise through a chimney stack. Although all precautions are taken to seal the upper portion of the annealing lehr as tightly as is practical, provision must be made for removing the continuous ribbon from the annealing lehr and hot gases adjacent to the surfaces of the continuous ribbon also escape through the top of the lehr. Those gases which do not escape cool near the top of the annealing lehr and return to the bottom of the lehr by passing downward along the cooler end enclosures or outer surfaces of the lehr. The essence of the problem produced by the "stack effect" with respect to the present invention is that the rising hot gases adjacent the surfaces of the continuous ribbon further contribute to the difference in temperature between the edge and the center of the ribbon.

Production facilities employing conventional annealing schedules may produce glass having undesirable differences in residual stress at different locations across the surface of the glass. This nonuniform residual stress causes cutting problems.

The resulting article may not be as flat as desired because the differences in the surface stress cause the article to curve or bow after it is severed from the ribbon.

Undesirable thermal conditions across the surfaces of the glass being annealed cause it to expand or contract depending upon the particular temperatures involved.

The present invention is concerned with controlling the temperature profile across the major surfaces of a glass article as the ribbon is cooled from a temperature at or slightly above the upper limit of the annealing range of the glass to equilibrium room temperature to control the various temperature profiles across the ribbon.

The present invention contemplates continuously controlling the temperature profiles existing across the major surfaces of the glass to maintain such temperature profiles within a predetermined relationship with respect to the temperature profile established as a reference, as the glass article is cooled to equilibrium room temperature.

The present invention is concerned with determining the temperature profile which exists across the major surfaces of the glass article when the temperature of the glass is at or just above the upper limit of the annealing range of the glass and thereafter, during the cooling schedule, continuously establishing the temperature profile in the glass, and then to maintain a temperature difference between two points on the profile. The points being defined as any point on the temperature profile located 13 to 23 percent of the width of the ribbon in from the edges of the ribbon, and the second point which is the ribbon center.

In the practice of the present invention, one may determine the temperature profile which exists across the major surfaces of the glass when the temperature is at or above the upper limit of the annealing range of the glass and thereafter continuously control other temperature profiles with respect to that reference temperature profile. It is desirable to induce a selected temperature profile across the major surfaces of the glass by means of heat transfer control devices and thereafter continuously maintain that temperature profile. It is, however, important that this reference temperature profile be established before the glass cools to a temperature substantially below the upper limit of the annealing range.

As the glass is cooled from the lower limit of the annealing range to equilibrium room temperature, the edges of the glass, i.e., edges normal to the temperature profile, are subjected to small stresses in tension because the temperatures of the edges of the glass have been continuously maintained slightly cooler than the portions of the glass inward to the center from the edges as the glass was cooled through the annealing range.

It is well known that a glass fracture will propagate in a direction normal to stresses in tension. Thus, by continuously maintaining the temperature profile across the major surfaces of the glass in accordance with the present invention, fractures in portions of the ribbon which have cooled to temperatures below the annealing range are diverted to the edges of the ribbon because of the stress profile induced in the ribbon, thereby minimizing production losses due to fractures running longitudinally along the ribbon.

It is also important to note that the temperature difference continuously maintained is of such a magnitude that the tensional forces are not sufficiently great to be objectional although they are of such a magnitude that they will divert fractures running longitudinally along the ribbon to the edges of the ribbon. If the difference between the differences in temperature between the corresponding points on the temperature profiles is greater than 20° F., then the tensional forces along the edge of the glass article become too great and the glass breaks too easily. If the difference becomes less than 0°, i.e., a negative value, then fractures in the glass will be diverted towards the center of the ribbon and run longitudinally along the ribbon.

The present invention is further described with respect to the best mode of operation as illustrated in the accompanying drawings.

Figure 1:
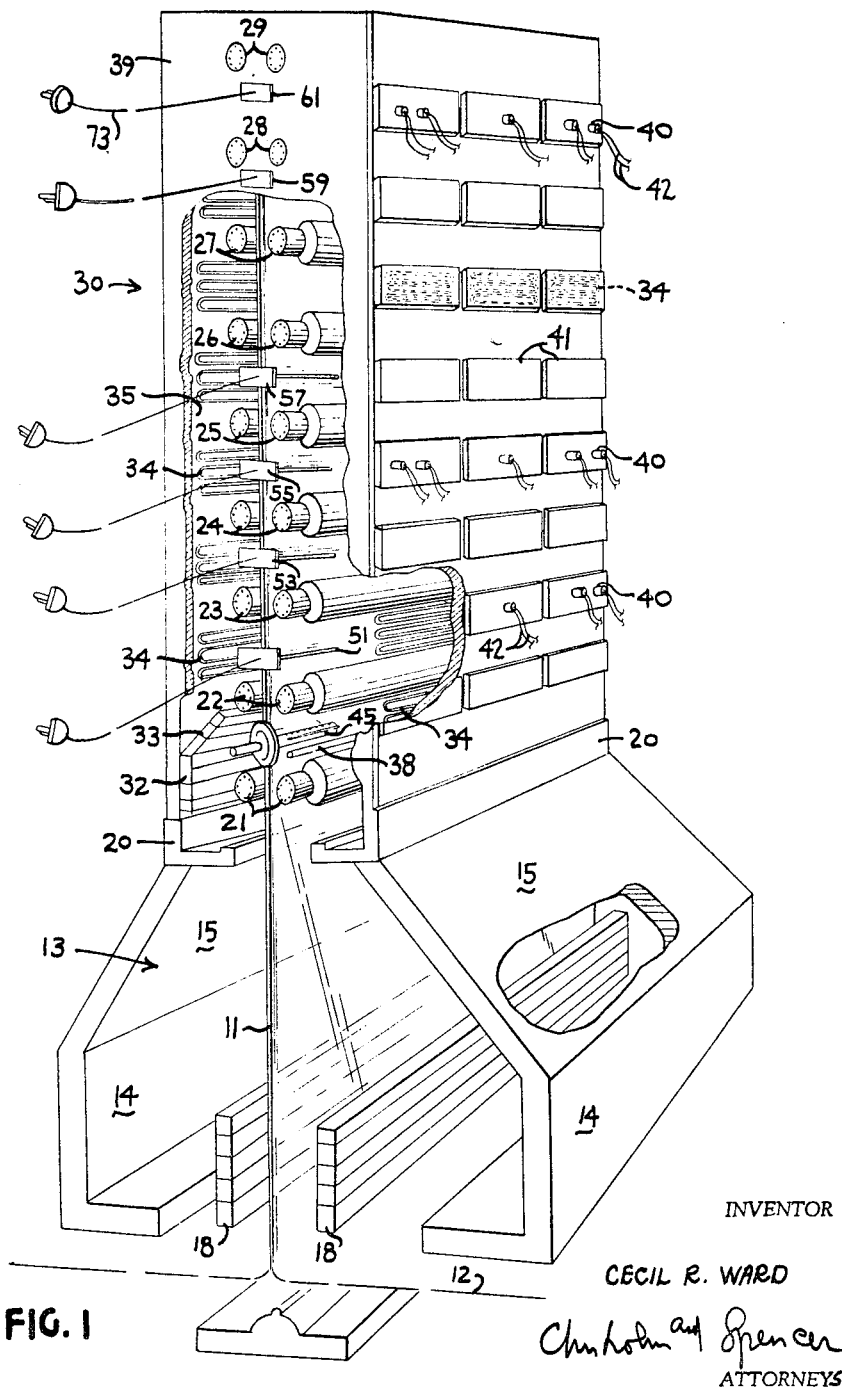
FIGURE 1 is a perspective view of a glass drawing machine illustrating a particular embodiment of the present invention.

Reference is now made to FIGURE 1, which shows an apparatus for drawing a continuous ribbon of glass 11 from a molten bath 12. As in a conventional drawing apparatus, a drawing chamber 13 is formed in part by L-blocks 14, ventilator water coolers 15, and cooled catchpans 20 and encloses an area above the bath and provides a suitable environment for the formation of the ribbon 11. The ribbon 11 is then conveyed through the enclosed annealing lehr 30 by a series of pairs of drawing rolls 21–29 and conveyed to a cutting station which is not illustrated in FIGURE 1 but is located some distance above the bath.

Figure 3:
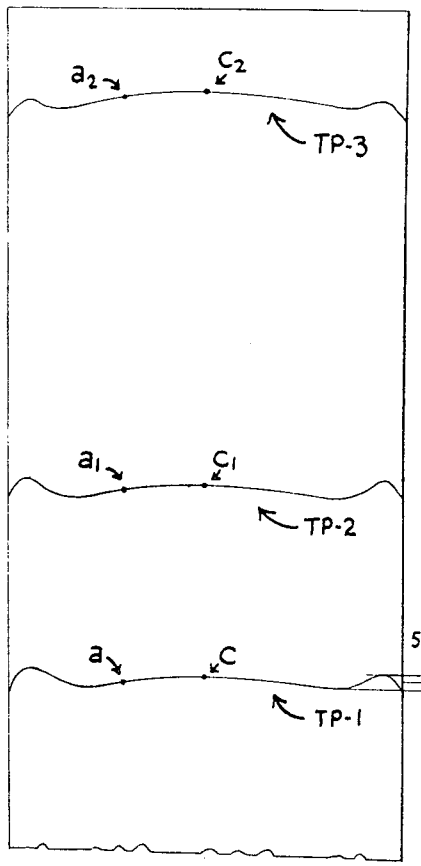
FIGURE 3 is a schematic view of a glass ribbon showing three typical temperature profiles.

In FIGURE 3, the curves TP–1, TP–2 and TP–3 schematically illustrate the temperature profile existing across the major surfaces of the ribbon as it is cooled from a temperature at or above the upper limit of the annealing range to a temperature below the lower limit of the annealing range of the glass being formed.

Generally speaking, the temperature of the continuous ribbon is above the upper limit of the annealing range as the ribbon is conveyed past drawing rolls 21. The ribbon is cooled to a temperature approximating the lower limit of the annealing range by the time the ribbon is conveyed past drawing rolls 27, and is further cooled to a temperature within the range of 250° to 300° F. by the time the ribbon reaches the cutting station above roll 29.

Figure 2:
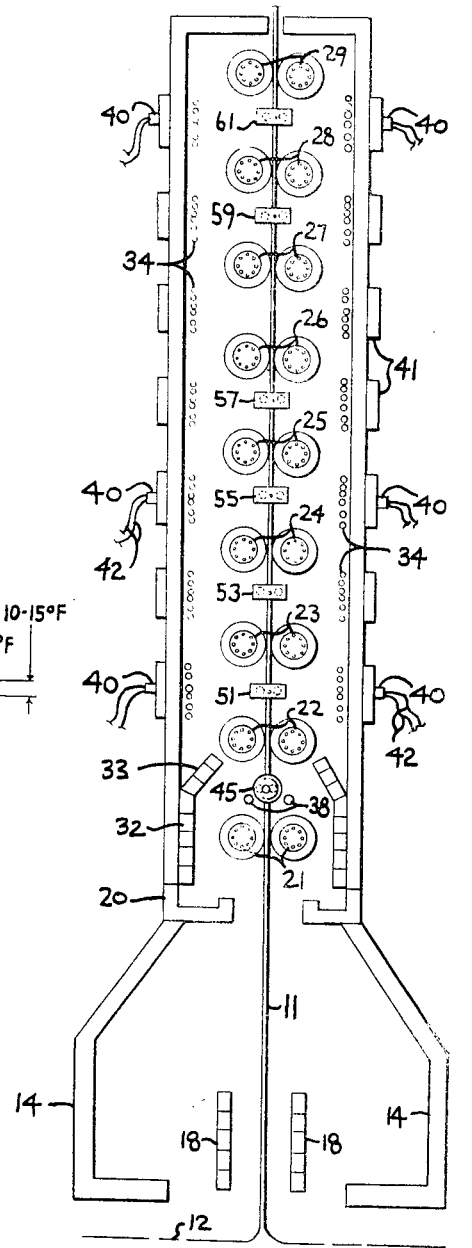
FIGURE 2 is an illustration showing an end view of the drawing machine illustrated in FIGURE 1.

As illustrated in FIGURES 1 and 2, several rows of electrical surface heaters 34 are vertically spaced along the internal surfaces of annealing lehr 30. Each row of surface heaters is divided into three sections and each surface heater 34 may be individually controlled. Thus, by controlling the current flowing through each surface heater, the temperature of localized surface areas of the continuous ribbon can be controlled within predetermined limits.

If surface cooling is required, doors 41 may be opened to cool localized surface areas of the ribbon 11.

To compensate for edge cooling effects, edge heating means 45, 51, 53, 55, 57, 59 and 61 are positioned adjacent to and surrounding the edges of continuous ribbon 11. Although not illustrated in FIGURE 1, similar edge heating means 46, 52, 54, 56, 58, 60 and 62 are positioned adjacent the other edge of the ribbon at substantially the same elevation in the annealing lehr 30. These edge heating devices can also be controlled individually in order that the temperature of localized areas of the edge portions of the ribbon may be individually controlled.

Coolers 32 and 38 are also employed to control the temperature of continuous ribbon 11.

A pair of water coolers 32 are positioned opposing both major surfaces of continuous ribbons 11 and extend the full width of annealing lehr 30. However, only one water cooler 32 is illustrated in FIGURE 1 in order that other elements of the apparatus may be shown. These water coolers are constructed in such a fashion that portions of the water coolers 33 are positioned close to the continuous ribbon 11.

Coolers 38 comprise a sectionalized air manifold extending across the width of the ribbon and having small orifices facing the major surfaces of the ribbon. Coolers 38 cool the ribbon by directing a low pressure flow of gas from the orifices onto the major surfaces of continuous ribbon 11. Only the end sections of coolers 38 are shown in FIGURES 1 and 2. Coolers 38 each consist of three sections. Each section opposes approximately one-third the width of continuous ribbon 11. The flow of cooling gas through each section is individually controlled in order that different rates of cooling may be effected on different areas of the continuous ribbon 11 as it is conveyed past coolers 38.

Referring now to FIGURE 3, the present invention will be described in greater detail. Curve TP–1 schematically illustrates the temperature profile existing across the major surfaces of that portion of continuous ribbon 11 opposite the temperature sensing devices 40 positioned between drawing rolls 22 and 23. At this position in the annealing lehr 30, the temperature of continuous ribbon 11 is at or slightly above the upper limit of the annealing range of the glass. Curve TP–1 thus constitutes the reference or primary temperature profile from which the other subsequent temperature profiles are measured.

Temperature profiles represented by curves TP–2 and

TP-3 are controlled by means of the edge and surface heaters described above to maintain the temperature of the profiles within a particular range of temperatures which can be determined with reference to base temperature profile curve TP-1.

The center point of each temperature profile is indicated as points C, $C_1$, and $C_2$. Point $a$ represents any point on curve TP-1 located between 13 and 23 percent of the width of the ribbon in from the edge of the ribbon. Points $a_1$, on curve TP-2, and $a_2$ on curve TP-3, correspond to point $a$ on curve TP-1. That is, with respect to position in the annealing lehr, points $a_1$ and $a_2$ are at the same elevation in the annealing lehr as points $C_1$ and $C_2$ and are spaced the same distance therefrom as point $a$ is spaced from C. With respect to the continuous ribbon, points $a$ and C, points $a_1$ and $C_1$, and points $a_2$ and $C_2$ may be considered as representing the same points on the surface of the ribbon at different positions in the annealing lehr as the ribbon is conveyed through said lehr.

A typical example of the preferred embodiment of this invention is as follows. The temperature profile C representing its center point C has a temperature of 1090° F. Point $a$ has a temperature of 1080 degrees. Point $C_1$ has a temperature of 1040 degrees and point $a_1$ has a temperature of 1020 degrees. Point $C_2$ has a temperature of 990° F. and point $a_2$ has a temperature of 960° F. the difference between the temperatures at points on curve C is the difference between 1090 degrees minus 1080 degrees or 10 degrees. The temperature difference at curve $C_1$ is the difference between 1040 degrees minus 1020 degrees or 20 degrees. The difference between point $C_2$ and $a_2$ is the difference between 990 degrees minus 960 degrees or 30 degrees. The temperature differences are as follows:

Curve 1—ten degrees,
Curve 2—twenty degrees, and
Curve 3—thirty degrees.

Hence, the difference between the temperature differences of curve 1 and curve 2 is 10 degrees. Similarly, the difference between the temperature difference of curve $C_1$ and $C_2$ is 10 degrees.

The temperature profiles at higher elevations in the process, such as curve TP-2, are determined by maintaining the difference between the temperature at point $C_1$ and the temperature at point $a_1$ between 0° F. and 20° F. more than the difference between the temperature at point C and the temperature at point $a$. The temperature profiles at all positions higher than reference curve TP-1 are controlled in a similar manner. Thus, curve TP-3 is controlled to continuously maintain the difference between the temperature at point $C_2$ and the temperature at point $a_2$ between 0° F. and 20° F. more than the difference between the temperature at point C and the temperature at point $a$.

The above described method of determining temperature limitations within which temperature profiles are continuously controlled will insure that the edge portions of the ribbon will be slightly cooler than the central portions as the ribbon is cooled to room temperature, thereby imposing the aforementioned desirable stress profile across the major surfaces of the ribbon.

Although the above described method of determining the temperature limits within which the temperature profiles will be maintained is the preferred method of practicing the present invention, it should be noted that the invention is not limited to selecting the temperature profile at or above the upper limit of the annealing range as the reference profile. Indeed, any temperature profile may be selected as the reference profile for purposes of calculation so long as the difference between the temperature of the two points on the temperature profile existing at or above the upper limit of the annealing range of the glass is continuously maintained 0° F. to 20° F. less than the difference between the temperature of those points on the temperature profiles existing across the major surfaces of the ribbon as the ribbon is cooled to equilibrium room temperature.

It should also be noted that the present invention may be practiced with reference to the temperature profile existing across the major surfaces of the ribbon at or slightly above the temperature of the upper limit of the annealing range either as such temperature profile would normally exist in the forming operation, or with reference to a temperature profile existing at that stage of the forming operation that constitutes a modification of the normal profile. The modified temperature profile may be induced by means of heat transfer devices such as heaters and coolers. When such a temperature profile is induced, the temperature profiles existing across the major surfaces of the ribbon as the ribbon is cooled to equilibrium temperature are continuously maintained within temperature limits calculated with reference to the modified temperature profile.

Figure 4:
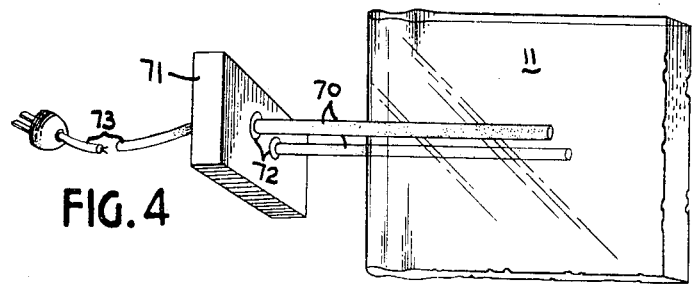
FIGURE 4 is a perspective view of an electrical resistance heating apparatus particularly suited for use in the present invention.

FIGURE 4 presents an oblique view of a particular electrical resistance heater that has been successfully employed as an edge heating element in the practice of the present invention. This electrical resistance edge heater is the type of heater illustrated as 51, 53, 55, 57, 59, and 61 in FIGURES 1 and 2. The first one-third functions as a heater; the remaining two-thirds of the length of the resistance elements are not heated and the nonheated extremities thereof are provided with prongs which serve the dual purpose of providing an electrical contact with, and support electrical resistance elements 70 from electrical heater element mounting block 71. Mounting block 71 is provided with dual receptacles 72 for receiving the electrical resistance heating elements 70, providing the required voltage and supporting the elements in the manner illustrated. The voltage required is provided to mounting block 71 by means of a suitable conduit such as a common wire and plug assembly 73.

Figure 5:
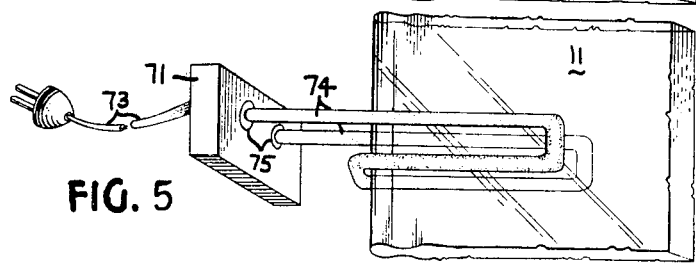
FIGURE 5 is a perspective view of an alternate electrical resistance heating apparatus which may be employed in the practice of the present invention.

As an alternate design, FIGURE 5 illustrates a comparable electrical resistance edge heater employing a single continuous electrical resistance heating element 74. This element provides certain advantages which are realized because of the manner in which the element is disposed around the edges of the continuous ribbon 11. The electrical resistance heating element 74 is curved in such a fashion that it not only provides parallel heating areas adjacent both surfaces of the continuous ribbon 11 but, in addition, element 74 has a heated portion concentric with the edge of the continuous ribbon 11, thereby providing additional heat at the edge of the ribbon to counteract the more rapid cooling experienced by the edge. In FIGURE 5, the electrical resistance heating element 74 is supported by and supplied with the requisite electrical energy by inserting the electrical resistance heating element into receptacles 75 provided in mounting block 71, which receives an adequate electrical energy supply by means of line 73.

Either of the electrical resistance heating elements illustrated in FIGURES 4 and 5 may be employed as the edge heating means 51–62 as in FIGURES 1 and 2.

Figure 6:
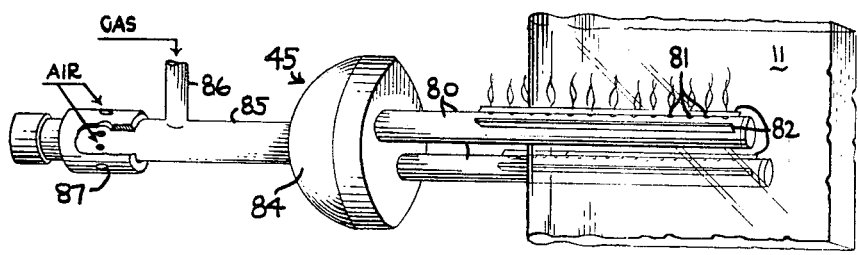
FIGURE 6 is a perspective view of a gas burner which may be used in the practice of the present invention.

FIGURE 6 illustrates an alternate edge heating means. This alternate edge heating means employs the energy derived from ignited combustible gases to provide radiant energy to control the temperature of the edge portions of the continuous ribbon 11. The edge heating apparatus illustrated in FIGURE 6 comprises a pair of ½ inch diameter iron pipes plugged at one end and threaded at the other end to be fitted into threaded openings 83, in the hemispherical shaped combustion gas mixing chamber 84. A combustible gas such as natural gas is introduced through inlet 86 into conduit 85, where it merges with atmospheric air supplied through holes in conduit 85 by means of corresponding holes in sleeve 87. Sleeve 87 is loosely fitted around the conduit 85 in order that it may be rotated thereby increasing or decreasing the size of the openings through which air may be introduced into conduit 85. Conduit 85 is capped at one extremity and threaded at the other extremity which is fitted within a threaded opening in the hemispherically shaped mixing chamber 84. The combustible gas introduced through inlet 86 and the air introduced through the openings in sleeve 87 and conduit 85 are conveyed by means of conduit 85 to the mixing chamber 84 and then through the ½ inch diameter pipes 80. The combustible mixture of gas and air escapes through orifices 81 where the mixture is ignited thereby providing the radiant energy required to control the temperature of the edge portions of the continuous ribbon 11. The orifices 81 comprise small holes, i.e., No. 55 holes drilled on ¼ inch centers for a distance of approximately 8 to 10 inches in from the plugged extremities of pipes 80. Small strips of metal 82 measuring approximately ⅛ inch by 8 to 10 inches by 1/64 inch thick are welded along the external surface of the combustible gas conduits 80 adjacent to the orifices 81 to provide shields for the flames issuing from the orifices to prevent blowouts which could result from air currents in the vicinity of the gas burner. The edge heating means illustrated in FIGURE 6 is the type shown as edge heating means 45 and 46 in FIGURES 1 and 2.

The edge heating means illustrated in the FIGURES 4, 5, and 6 are loosely fitted through openings provided in the end enclosures 39 of the annealing lehr 30 as illustrated in FIGURE 1. The edge heating means may then be moved towards and away from the edge of the continuous ribbon 11 thereby changing the relationship of the edge heating means to the edge of the continuous ribbon 11 in order that the desired heating effect may be obtained. In addition, the current flowing through the electrical resistant heating elements shown in FIGURES 4 and 5 may be adjusted, and the gas flow to the burner illustrated in FIGURE 6 may be varied to increase or decrease the energy supplied to the edge portion of the continuous ribbon 11 as the need may require.

A plurality of temperature sensing instruments 40 are positioned at strategic locations in the annealing lehr 30. A total of 15 such temperature sensing devices are illustrated in FIGURES 1 and 2. The temperature sensing devices are positioned in three horizontal rows of five instruments each extending across the annealing lehr 30. One instrument in each row is positioned in the center of the annealing lehr 30 to sense the temperature of the center of the continuous ribbon 11 at that particular elevation in the lehr. Two temperature sensing devices 40 are positioned to measure the temperature of the ribbon a short distance, e.g., 3 to 8 inches, in from the edges of the continuous ribbon 11. The remaining two temperature sensing devices in each row are positioned to measure the temperature of the surface of the continuous ribbon 11 at a further distance in from the edges of the continuous ribbon 11, e.g., 15 to 20 inches in from the edges.

The temperature responsive elements are constructed with filters responsive only to the 4 to 8 micron wavelength band of infrared radiation. At this wavelength, glass is almost opaque so that the temperature responsive instruments trained on one surface area of the glass senses the temperature radiated by that glass surface only and is not responsive to heating elements located on the other side of the continuous ribbon. The temperature responsive instruments each comprise a mirror, a thermopile at the focal point of the mirror, and an electric circuit actuated in response to the thermoplie, to filter out radiation other than the desired 4 to 8 micron wavelength band. A diffusion type band filter is used between the mirror and the thermopile. Such devices are well-known in the art and their structural details are not part of this invention.

Electrical signals are transmitted from the temperature sensing devices 40 to suitable temperature recorders by means of wires 42. The operator by observing temperature fluctuations in the measurements indicated on such recorders continuously observes the operation and modifies the current supplied to edge heaters 51–62 and surface heaters 34, adjusts the air supplied to cooler 38, or modifies the combustible gas mixture supplied to burners 45 and 46, to correct or compensate for such fluctuations.

The following is an example, by way of illustration only, of a preferred embodiment of the present invention as employed in the manufacture of sheet glass.

A ribbon of glass approximately 100 inches wide and 7/32 inch thick is continuously formed by mechanically drawing it from a partially enclosed bath of molten glass maintained at a temperature of approximately 1800° F. and consisting of:

| Ingredient: | Percent by weight |
| --- | --- |
| $SiO_2$ | 71.38 |
| $Na_2O$ | 12.79 |
| CaO | 9.67 |
| MgO | 4.33 |
| $Na_2SO_4$ | 0.75 |
| NaCl | 0.12 |
| $Fe_2O_3$ | 0.15 |
| $Al_2O_3$ | 0.81 |

In accordance with the definitions set forth above, the upper limit of the annealing range for glass of the composition described above is approximately 1100° F. and the lower limit is approximately 960° F.

The ribbon 11, formed and drawn upwardly by the traction of pairs of opposed drawing rolls 21–29 acting upon the already formed portion of the ribbon, first passes between a pair of vertically disposed heat exchangers 18 within the drawing chamber which remove heat from the continuous ribbon and the drawing chamber. In addition, the ventilator coolers 15, which form a part of the drawing chamber, also remove heat from the ribbon and the drawing chamber. As the ribbon travels upwardly, the portion thereof leaving the drawing chamber passes catch pan coolers 20 on each side of the ribbon which remove additional heat from the ribbon and the drawing chamber. In this manner, the temperature of the continuous ribbon is reduced to approximately 1175° F. as it leaves the drawing chamber. Another pair of coolers 32, one cooler on each side of the ribbon, located just above the drawing chamber and within the enclosed portion of the drawing machine, withdraws additional heat from the ribbon. At substantially the same elevation, sectionalized air manifold coolers 38 remove additional heat from the ribbon. However, because collers 38 are sectionalized they may be employed to cool localized areas across the major surfaces of the ribbon at diffused rates of heat transfer.

Because of the edge effects associated with the continuous ribbon being annealed, if auxiliary edge heating means were not employed, the edge portions of the ribbon would be at a considerably lower temperature than the central portions of the ribbon. To compensate for this edge cooling effect, edge heating means 45 and 46 positioned adjacent to the edges of the continuous ribbon and in substantially the same vertical position as coolers 32 and 38 supply heat to the edge portions of the ribbon. Through the combined use of edge burners 45 and 46 and coolers 38, the temperature profile across the ribbon can be maintained within a range of approximately 20° F. as illustrated by curve TP–1 in FIGURE 3. Therefore, the temperature profile across the major surfaces of the continuous ribbon as the ribbon passes the second set of drawing rolls in the annealing lehr is maintained between 1105° F. and 1125° F.

In addition to raising the temperature of the edge portions of the ribbon, the temperature of the portion of the ribbon just inward from the edge portion is maintained approximately 5° to 10° F. below the temperature of the central and edge portions, as depicted on the profile TP-1, in FIG. 3.

The continuous ribbon of glass is cooled in accordance with a predetermined annealing schedule as it is conveyed upward through the annealing lehr. The temperature of the major surfaces of the continuous ribbon 11 is controlled by surface heating means 34 within the enclosed lehr as is the temperature gradient through the thickness of the glass. In order that there will be no great deviations in temperature across the major surfaces of the glass sheet, particularly in the vicinity of the edge portions of the sheet, the temperature of the edge portions is controlled by means of electrical resistant heating elements 51–62, such as those illustrated in FIGURE 4, which are positioned adjacent to the edges of the continuous ribbon 11 between the vertically spaced drawing rolls. By employing these edge heating means and observing the temperature profile of the continuous ribbon at different locations in the annealing lehr by means of temperature responsive devices 40, it is possible to continuously control the temperature profiles across the major surfaces of the ribbon as the ribbon is conveyed through the annealing lehr by adjusting the current supplied to radiant heaters 34 and edge heaters 51–62.

Thus, approximately mid-way between drawing rolls 24 and 25 the temperature profile across the major surfaces of the continuous ribbon 11 is maintained between 1045° F. and 1065° F., i.e., within a range of approximately 20° F. as illustrated by curve TP–2 in FIGURE 3. If edge heating means 51 through 56 were not employed, the temperature profile across the major surfaces of the ribbon at this position in the forming operation would vary over a temperature range of 25 to 50° F.

As the continuous ribbon 11 is conveyed further through the lehr, the temperature profile across the major surfaces of the ribbon is controlled by additional surface heating elements 34 and edge heating means 57 through 62. Approximately midway between drawing rolls 28 and 29 the temperature profile across the major surfaces of the continuous ribbon is still maintained within a range of approximately 20° F., as illustrated by curve TP–3 in FIGURE 3. The temperature profile across the major surfaces of the continuous ribbon between drawing rolls 28 and 29 is generally within 910° F. to 930° F.

Although the use of edge heating devices is beneficial in the lower portion of the annealing lehr where the temperature of the ribbon is near the upper limit of the annealing range, the greatest benefit is obtained from the use of the edge heating devices in the upper portion of the enclosed lehr. This is particularly significant in the practice of the present invention insofar as it requires a high degree of temperature control throughout the process of cooling the ribbon from the upper limit of the annealing range to a temperature within the range of 250° to 300° F. It is even more significant where the ribbon is being cooled in an enclosed vertical annealing lehr, such as that shown in FIGURES 1 and 2, where the "stack effect" and edge cooling would render the required control of the temperature profile extremely difficult, if not impossible, without the use of ancillary edge heating devices.

In the preferred operation of the facility illustrated in FIGURES 1 and 2 wherein a glass ribbon having bulbar edges is produced, it has been found desirable to impose a particular reference temperature profile across the major surfaces of the ribbon. This is affected by means of edge burners 45 and 46, sectionalized air manifold coolers 38, and the lowest row of surface heaters 34. The particular temperature profile imposed upon the ribbon is such that highest temperature exists at the center of the ribbon or near the edge portions of the ribbon while maintaining the portion of the ribbon just inward from the edges of the ribbon at a temperature 10° to 20° F. lower than the maximum temperature of the profile and 5° to 10° F. lower than the secondary peak in the temperature profile curve. Thus, a preferred reference temperature profile curve has three peak points. The peak points are located at the center of the ribbon and from 0 to 8 percent, usually 1 to 5 percent, of the width of the ribbon inward from both edges of the ribbon. Such a modified reference temperature profile is illustrated as temperature profile TP–1 in FIGURE 3, wherein it is depicted that the peak temperature in the edge zone of 0 to 8 percent of the width of the sheet from the edge of the sheet is 10° to 15° F. more than the peak temperature of the zone inwardly thereof and, the peak temperature in the latter zone is 5° to 10° F. less than the temperature of the point at the center of the sheet.

Figure 7:
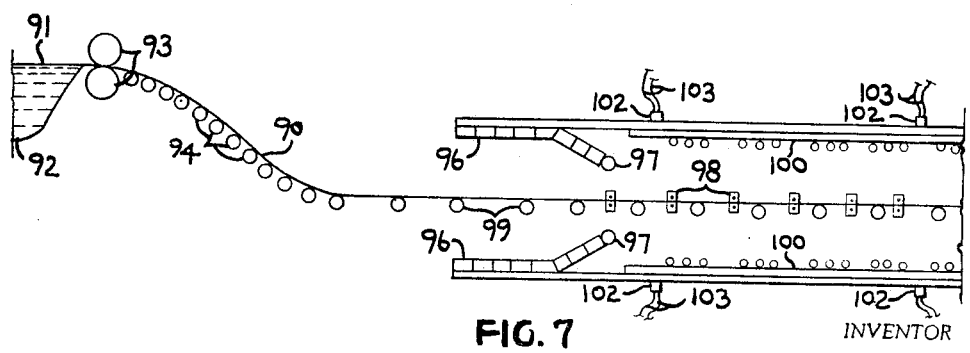
FIGURE 7 shows an end view of a flat glass forming operation and illustrates the manner in which the present invention may be practiced in a horizontal annealing lehr.

FIGURE 7 illustrates a typical horizontal lehr which may be employed for treating glass by the method of this invention.

In FIGURE 7, a continuous ribbon of glass 90 is formed from a molten glass bath 91 contained in tank 92 by means of forming rolls 93. The continuous ribbon 90 is conveyed by means of apron rolls 94 into a horizontal annealing lehr 95 where water coolers 96 cool the continuous ribbon to a temperature at or immediately above the upper limit of the annealing range of the glass. Sectionalized air manifold coolers 97 and the first pair of edge heaters 98 may be employed to establish a temperature profile across the major surfaces of the continuous ribbon. Edge heaters 98 are of the type illustrated in FIGURE 4 and are positioned adjacent the edge portions of continuous ribbon 90 as illustrated therein.

Continuous ribbon 90 is conveyed further through annealing lehr 95 by conveying rolls 99. Annealing lehr 95 may be constructed with insulation 100 and surface heating elements 101 to provide for greater efficiency and control of the thermal treatment being conducted. Edge heaters 98 are positioned between the conveying rolls along the edge portions of the ribbon to retard edge cooling and maintain the temperature profile across the major surfaces of the ribbon within predetermined limits.

The temperature profile across the major surfaces of the continuous ribbon 90 and the rate of cooling are maintained within predetermined limits in accordance with a preselected cooling schedule by controlling the radiant energy supplied by edge heaters 98 and surface heating elements 101. The temperature of the ribbon 90 at different positions in the lehr 95 is continuously monitored by temperature sensing devices 102 which transmit electrical signals to temperature recording devices (not illustrated) by means of wires 103. The annealing lehr operator, by observing the temperatures recorded, may then adjust the current supplied to edge heaters 98 and surface heating elements 101 to maintain the temperature of the ribbon within predetermined ranges.

The continuous ribbon 90, after leaving annealing lehr 95, is carried by additional conveying rolls 99 to an appropriate cutting station. During this portion of travel the temperature of the ribbon 90 is approaching equilibrium room temperature and an enclosed apparatus with auxiliary heating devices is not required to maintain the temperature profile within the temperature limitations of this invention. The temperature profile may be adequately controlled by impinging currents of cool air against selected surface areas of the ribbon.

Although the horizontal process illustrated in FIGURE 7 is described as a forming operation for a continuous ribbon of glass, it should be understood that a similar facility may be employed for cooling individual plates of glass from a temperature at or above the upper limit of the annealing range of the glass to equilibrium room temperature. For example, if the glass tank and apron rolls illustrated in FIGURE 7 were replaced with a facility for spray coating glass plates, the coated glass plates could then be conveyed through annealing lehr 95 and to a cutting station while cooling the glass plates in accordance with the present invention.

Typical embodiments of the invention as it would be practiced in a vertical and in a horizontal glass forming process have been described. In each embodiment, a suitable number of temperature sensing devices, localized surface heaters and edge heaters have been disclosed in sufficient detail to enable one skilled in the art to utilize the method of cooling glass disclosed herein.

I claim:

1. In a process for cooling throughout the thickness thereof a sheet of glass formed from a molten bath of glass wherein the temperature profile transversely of the sheet, when it enters the upper limits of the annealing range of said glass, is such that there is a primary profile differential between the temperature at a point in a zone disposed centrally of the glass sheet and the temperature of a point in the sheet adjacent either edge of said sheet and located in a zone extending up to about 23 percent of the total width of said sheet from the edge of said sheet, the improvement which comprises:

progressively cooling said sheet to a temperature of below about 250° F. to vary subsequent temperature profiles, and adjusting the temperature of the sheet transversely thereof, until each subsequent temperature profile of any line transverse of said sheets during the cooling thereof, so that the temperature of the said edge point of said sheet shall be 0° to 20° F. cooler relative to the center point of said sheet than was the temperature of the same edge point relative to the center point of said sheet in said primary temperature profile.

2. The process of claim 1 wherein said point in the sheet adjacent either edge of said sheet is located in a zone extending between 13 percent and 23 percent of the total width of said sheet from the edge of said sheet.

3. The process of claim 2 wherein the temperature of said point adjacent either edge of said sheet is from 5° to 10° F. cooler relative to the center point of said sheet than was the temperature of the same edge point relative to the center point of said sheet in said primary temperature profile.

4. The process of claim 3 wherein the temperature throughout the thickness of said sheet in each subsequent temperature profile is adjusted transversely thereof until the temperature at a point adjacent each edge of said sheet and located in a zone up to 8 percent of the total width of said sheet from the adjacent edge thereof is from 10° to 15° F. more than the highest temperature in the adjacent zone in said sheet located inwardly of said last-named zone.

5. The process of claim 1 wherein the temperature throughout the thickness of said sheet in each subsequent temperature profile is adjusted transversely thereof until the temperature at a point adjacent each edge of said sheet and located in a zone up to 8 percent of the total width of said sheet from the adjacent edge thereof is from 10° to 15° F. more than the highest temperature in the adjacent zone in said sheet located inwardly of said last-named zone.

References Cited

UNITED STATES PATENTS

| | | | |
|---|---|---|---|
| 2,774,190 | 12/1956 | Atkeson | 65—162 XR |
| 3,107,196 | 10/1963 | Acloque | 65—95 XR |
| 3,226,217 | 12/1965 | Oxley et al. | 65—95 |
| 3,226,216 | 12/1965 | Oxley et al. | 65—95 |
| 3,294,510 | 12/1966 | Bauduin | 65—95 |

FRANK W. MIGA, Primary Examiner

U.S. Cl. X.R.

65—95, 162, 194, 349